Dec. 3, 1968  E. F. WEISER  3,414,795
CIRCUIT TO CONTROL MOTOR CURRENT OR BATTERY CHARGING CURRENT
Original Filed Nov. 20, 1964  2 Sheets-Sheet 1

INVENTOR.
EARNEST F. WEISER
BY
HIS ATTORNEY

INVENTOR.
EARNEST F. WEISER

HIS ATTORNEY

United States Patent Office 3,414,795
Patented Dec. 3, 1968

3,414,795
CIRCUIT TO CONTROL MOTOR CURRENT OR BATTERY CHARGING CURRENT
Earnest F. Weiser, Erie, Pa., assignor to General Electric Company, a corporation of New York
Original application Nov. 20, 1964, Ser. No. 412,809, now Patent No. 3,378,746. Divided and this application Dec. 29, 1967, Ser. No. 694,738
3 Claims. (Cl. 320—9)

ABSTRACT OF THE DISCLOSURE

A battery-powered D-C motor control system in which unidirectional pulses from a chopper circuit can be for energizing a D-C motor or for charging a battery, with the circuitry used for motor control purposes also aiding in controlling the battery charging.

Cross reference to related application

This is a division of application Ser. No. 412,809, filed on Nov. 20, 1964, now Patent No. 3,378,746.

Background of the invention

This invention relates generally to a control circuit for a D-C motor and, more particularly, to a motor control circuit for a battery powered vehicle.

In an electrically powered vehicle, as in any vehicle, it is desirable to have a motor control which produces good acceleration characteristics, accurate running speed control and sound braking capabilities. Because of their relatively small size, resistance to shock and economy, it is desirable to produce these features with static control devices. These objectives may be realized by using the solid state motor control circuit of this invention.

Therefore, it is an obejct of this invention to provide an improved motor control circuit.

Another object of this invention is to provide an electrically powered vehicle with complete solid state electronic torque control means.

Another object of this invention is to provide a motor control circuit that yields high torque during acceleration and weakened field during running at a higher speed.

Yet another object of this invention is to provide a battery powered vehicle in which the battery may be recharged without the use of additional circuitry.

Briefly, in one form thereof, this invention employs electronic circuitry to control the operations of the motor of an electrically powered vehicle. The motor which may be a conventional D-C separately excited motor, is supplied from a fixed supply, such as a battery. Motor torque is varied by converting the output of the fixed supply to a form that can be controlled to adjust the average power supplied to the motor armature circuit. This is achieved by using a converting means, such as a silicon controlled rectifier (SCR) chopper circuit, in series with the motor armature. The average power supplied to the motor armature is varied by a torque control means, such as a unijunction transistor oscillator circuit, which is connected to the chopper circuit to set the rate of repetition of the pulses produced by the chopper circuit. Control of the torque control means is achieved from a torque setting means, which is under the direct supervision of the operator. During operation it is desirable to have a high torque during acceleration and less torque during running at a constant speed. These results are achieved by connecting a control means to the shunt field of the motor. The control means comprises an SCR chopper circuit and a unijunction transistor oscillator circuit. Setting of the control means is controlled by a current-measuring means, which may comprise a transistorized differential amplifier. Regenerative braking is also achieved from the current-measuring means and the control means, by controlling the output of the current-measuring means with a brake means under the supervision of the operator. Reversal of the motor is accomplished with the aid of an interlock system to prevent to prevent reversal unless the motor is at a standstill or very slow speed of rotation. Charging of the battery is achieved by plugging into a conventional A-C supply and using the converting means and speed control means to regulate the charging. Provision is made to protect the battery from excessive charging current and voltage.

The novel and distinctive features of the invention are set forth in the appended claims. The invention itself, together with further objects and advantages thereof, may be understood by reference to the following description and accompanying drawings.

Specification

Figure 1:
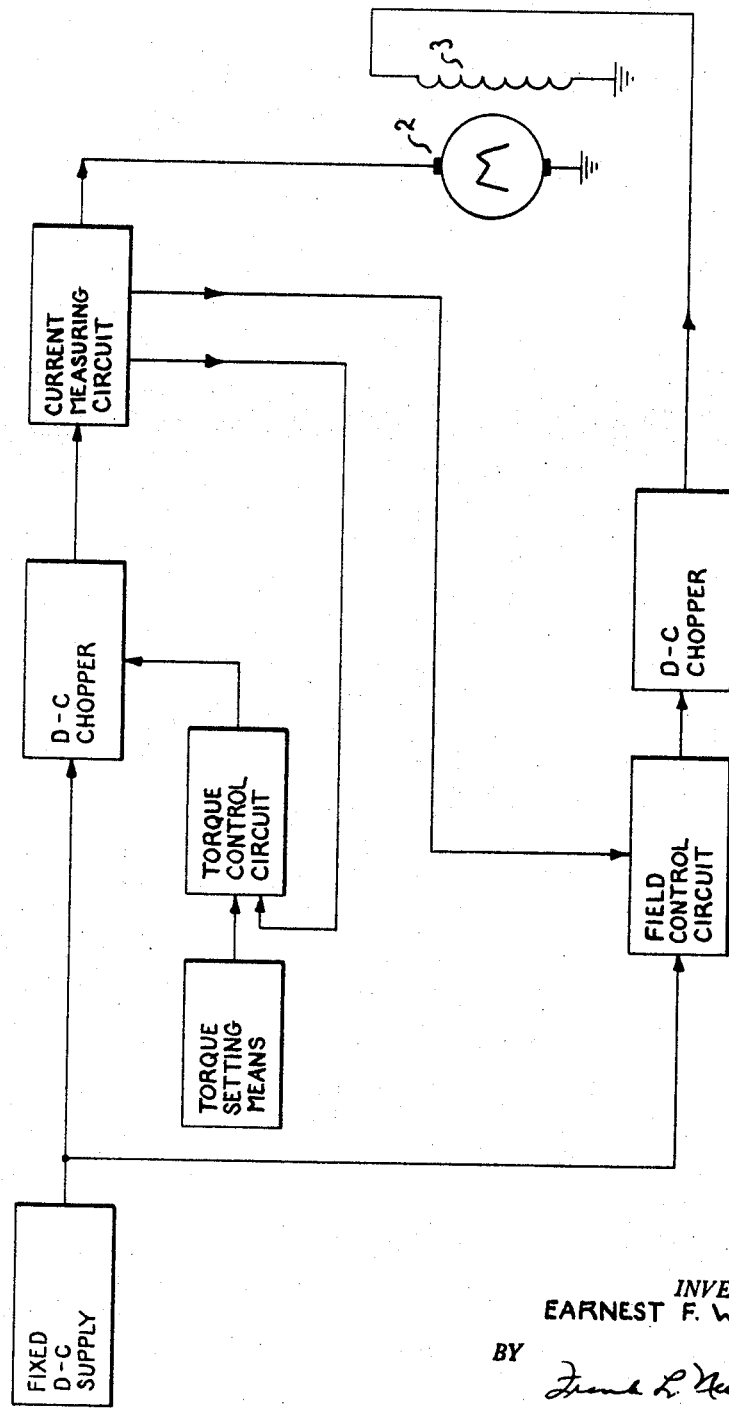
FIGURE 1 is a simplified block diagram illustration of the control system of this invention in its motoring mode of operation.

As shown in the simplified block diagram of FIGURE 1, the armature circuit 2 of a direct current motor M is supplied controlled energy from a fixed D-C supply through a series D-C chopper circuit. Similarly, the field winding 3 is supplied with controlled energy from the fixed D-C supply through a separate D-C chopper circuit. The "chopping" or repetition rates of the respective D-C chopper circuits determines the average power supplied to the motor armature and field circuits respectively to thereby control the operation of the motor. Each of the D-C chopper circuits is provided with a control circuit which controls the repetition rate thereof. These control circuits are designated "torque control circuit." and "field control circuit" respectively.

The repetition rate of the D-C chopper circuit supplying the motor armature circuit is controlled in response to the positioning of a torque setting means, such as a foot pedal controlled by the operator, for example, through the torque control circuit, which may conveniently be a relaxation oscillator whose period is controlled by the position of the torque setting means. The average power supplied to the motor armature circuit is thus controlled thereby controlling motor torque in a desired manner.

Since it is desirable to provide for a higher torque during acceleration than during running at constant speed, the system provides for control of the field excitation in a controlled manner so as to control the operating characteristics of the motor. To this end, a current measuring means is provided for sensing the armature current. One output of the current measuring means is utilized to control the field control circuit, which in turn controls the reptition rate of the D-C chopper circuit supplying the field winding 3, to regulate the field current. Another output of the current measuring means is utilized to control the torque control circuit to assure that the armature current is limited to a predetermined maximum value.

Figure 2:
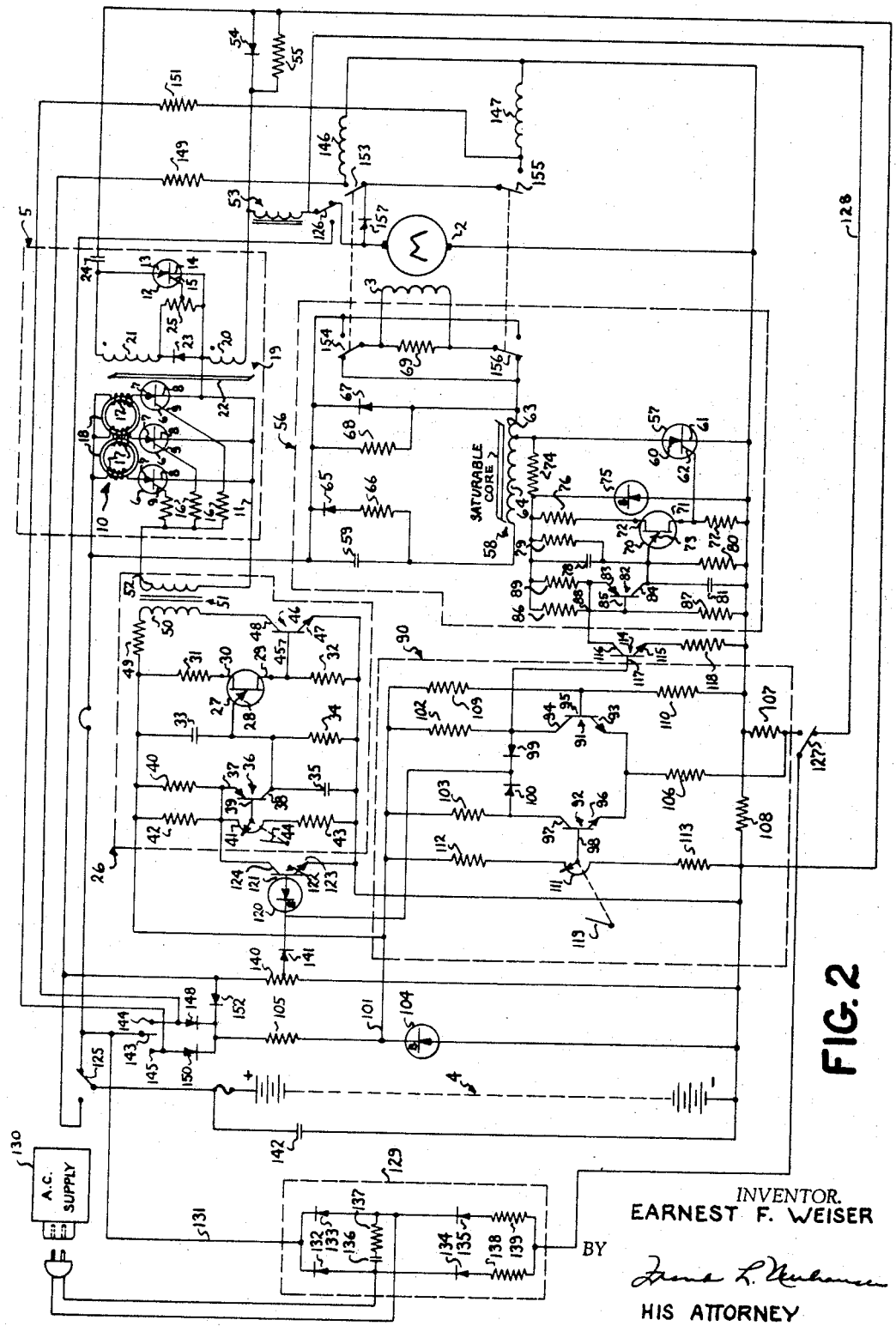
FIGURE 2 is a schematic circuit diagram of a complete control system in accordance with one embodiment of this invention.

Referring now to FIGURE 2 of the drawings, there is shown a motor M having an armature circuit 2 and a shunt field winding 3. The motor is provided with energy from a fixed supply, such as battery 4. Since the battery 4 is a fixed supply it is necessary to provide some means for varying the power supplied to the motor. This is achieved by converting the fixed supply into a pulsating supply with a converting means, shown as a D-C chopper circuit 5. Chopper circuit 5 includes a plurality of controlled rectifier devices 6, which are shown as being silicon controlled rectifiers (SCR's) each having an anode 7, a cathode 8 and a control electrode, or gate 9. The anode elements 7 of controlled rectifiers 6 are connected through a current equalizing inductor 10 to the positive side of battery 4 and the cathode elements 8 of controlled rectifiers 6 are connected to the lead 11. The chopper circuit also includes a commutation circuit including the controlled rectifier 12 having an anode 13, a cathode 14 and a gate 15. Gating pulses, to initiate conduction in controlled rectifiers 6, are applied to the gates 9 thereof through equalizing resistances 16. Power is transmitted to the commutation circuit over the lead 11.

Equalizing inductors are well known in the art and may be conveniently arranged to provide the desired current equalization by a suitable combination of reactance and resistance. As illustrated, the equalizing inductor 10 comprises the three windings 17 arranged about a pair of common magnetic cores 18.

The line 11 is connected to a point on a saturable core transformer 19. Transformer 19 has a pair of winding portions 20 and 21 and a saturable core 22. Connected between winding portions 20 and 21 of transformer 19 is a diode 23 and connected in series with winding portions 20 and 21 and diode 23 is an SCR commutating capacitor 24. One terminal of the capacitor 24 is connected to the negative side of the battery 4, while the other terminal of capacitor 24 is connected to one end of the winding portion 21 and to the anode 13 of the SCR 12. The cathode 14 of SCR 12 is connected between winding portion 20 and diode 23 at the point where the line 11 is also connected to the transformer. A gating signal for SCR 12 is obtained through a resistor 25 connected between the gate 15 of SCR 12 and the junction of diode 23 and winding portion 21.

Since the current delivered to the armature circuit 2 of the motor depends upon the rate at which SCR's 6 are fired or gated into conduction, it is desirable to have the firing rate determined by a means subject to the control of an operator. This current control means is indicated generally at 26 in the figure. The current control means 26 is basically a unijunction transistor relaxation oscillator, the basic element of which is a unijunction transistor (UJT) 27, which has an emitter 28, a base one 29 and a base two 30. The base 30 of the UJT 27 is connected to the positive side of the power source through a resistor 31, while the base 29 of UJT 27 is connected to the negative side of the power source through a resistor 32. The emitter 28 of UJT 27 is connected to the midpoint of a divider formed from a capacitor 34 and a resistor 33. Emitter 28 is also connected to one side of a capacitor 35, while the other side of the capacitor 35 is connected to the negative side of the battery 4. Capacitor 35 is connected in series with a transistor 36, which has an emitter 37, a collector 38, and a base 39. The emitter 37 of transistor 36 is connected to the positive side of the battery through a resistor 40. The base 39 of transistor 36 receives a bias from a variable voltage device 41, which forms a voltage divider along with resistors 42 and 43. The setting of the variable voltage device 41 is controlled by a current setting means 44. The current setting means 44 is indicated as a simple foot pedal, but may just as easily be a remote setting means of some type. The output of the unijunction transistor oscillator is taken from between the base 29 of the UJT 27 and the resistor 32 and suitably amplified by application to the base 45 of a transistor 46, which also has an emitter 47, and a collector 48. The transistor 46 is in series with a resistor 49 and a winding 50 of a transformer 51. The other side of the transformer 51 has a winding 52 connected to the resistors 16 in the gate circuits of the SCR's 6.

The output of chopper circuit 5 is applied to the armature 2 of the motor through an inductor 53, which serves to average the current by sustaining current flow during the off time through a diode 54, which is in parallel with a resistor 55.

While the chopper circuit controls the motor torque by varying the current applied to the motor armature, the current supplied to the shunt field 3 of the motor may be varied to control the operating characteristics thereof. The current supplied to field winding 3 is adjusted by control means generally indicated within the dotted lines at 56. The control means 56 includes a chopper circuit and unijunction transistor oscillator circuits similar to those discussed in connection with the armature supply. The chopper circuit of control means 56 comprises an SCR 57, a saturable core transformer 58, and a capacitor 59. The SCR 57 has an anode 60, a cathode 61, and a gate 62. The cathode 61 is connected to the negative side of battery 4 and the anode 60 is connected to the winding of the transformer 58, dividing the winding into portions 63 and 64.

One side of the winding portion 64 of the transformer 58 is connected to the capacitor 59, which is shunted by a diode 65 and a resistor 66 connected in series. The other side of capacitor 59 is connected to the positive side of battery 4. One side of the winding portion 63 of transformer 58 is arranged to be connected to capacitor 59 through the shunt field 3. The other sides of winding portion 63 and 64 are joined together at the point connected to the anode 60 of the SCR 57. Connected in parallel with the shunt field winding 3 is a parallel combination of a diode 67 and a resistor 68. A resistor 69 is connected directly across the field winding 3.

Control of the chopping rate of the chopper circuit is achieved by control of the firing pulse applied to the gate 62 of SCR 57. This control is achieved by the use of a unijunction transistor relaxation oscillator including a UJT 70, which has a base one 71, a base two 72, and an emitter 73. Power for the oscillator is obtained from the point between the winding portions 63 and 64 on the transformer 58 through a resistor 74. The supply obtained through resistor 74 is regulated constant by a breakdown diode 75. Base 72 of the UJT 70 is connected to the supply, obtained through the resistor 74, through a resistor 76. Similarly, base 71 of UJT 70 is connected to the negative side of the battery through a resistor 77. The emitter 73 of UJT 70 is connected to a divider network having a parallel connection of a capacitor 78 and a resistor 79 on one side, and resistor 80 on the other side. Emitter 73 is also connected to one terminal of a capacitor 81, which is charged through a transistor 82. The transistor 82 has an emitter 83, a collector 84, and a base 85. The base 85 is biased from a voltage divider network comprising resistors 86 and 87. Additional control of the bias condition of the transistor 82 and the charging rate of the capacitor 81 is obtained from another circuit on a line 88, connected to emitter 83 of transistor 82. The emitter 83 is also connected to the regulated supply through a resistor 89.

Determining the oscillating rate of the unijunction transistor oscillator, and thereby the amount of current flow in the shunt field 3, is a very important factor in obtaining the desired motor operating characteristics and achieving braking of the vehicle. Setting of the frequency of the oscillation to achieve both of these functions may be realized by the use of a current measuring circuit indicated generally at 90. The current measuring circuit 90 is primarily a differential amplifier formed from transistors 91 and 92. The transistor 91 has an emitter 93, a collector 94, and a base 95; while the transistor 92 has an emitter 96, a collector 97 and a base 98. A pair of diodes 99 and 100 are connected in a back-to-back arrangement between the collectors 94 and 97. Collectors 94 and 97 are connected to a line 101 through resistors 102 and 103, respectively. The line 101 is kept at a constant voltage value by a breakdown diode 104 which is connected to the positive side of the battery 4 through a resistor 105.

Emitters 93 and 96 of transistors 91 and 92 are joined together and connected to the negative side of battery 4 through resistors 106, 107, and 108. The base 95 of transistor 91 is provided with a bias from a voltage divider network consisting of resistors 109 and 110. Base 98 of transistor 92 is biased from a voltage divider network comprising variable voltage device 111 and fixed resistances 112 and 113.

Setting of the frequency of oscillation of the unijunction transistor relaxation oscillator circuit is achieved by taking an output signal from the collector 94 of transistor 91 and applying it to the UJT oscillator circuit in control means 56 through a voltage responsive device. The voltage responsive device in this case is a transistor 114 having an emitter 115, a collector 116, and a base 117. The emitter 115 is connected to the negative side of the battery 4 through a resistor 118 and the resistor 108. The collector 116 of transistor 114 is connected over line 88 to control means 56. The output of collector 94 of transistor 91 is determined either by the magnitude of the armature current causing a voltage drop across resistor 108, or by the brake means 119. As in the case of accelerator 44, the brake means 119 is shown as a foot pedal, but may just as easily be a remote braking control.

Another output of the differential amplifier may be taken from a point between the diodes 99 and 100. This output is applied to a breakdown diode 120. In order to break down the diode 120 when the armature current is large, the output of the differential amplifier reaches and exceeds the breakdown voltage of the diode 120. The breakdown diode 120 is connected to base 121 of transistor 122, which has an emitter 123 and a collector 124. The collector 124 is connected to emitter 37 of transistor 36, while emitter 123 is connected to the negative side of battery 4. The bias supplied to base 121 of transistor 122 upon breakdown of the diode 120 is such as to set a minimum value upon the time of charging capacitor 35 so that the motor current is limited to a maximum value.

As it will be necessary to recharge the battery 4 from time to time, provision has been made to use converting means 5 and control circuit 26 to adjust the charging rate. The use of circuits 5 and 26 to control battery charging is made possible by the switch elements 125, 126, and 127. The switch elements 125, and 126, upon actuation, serve to place the battery 4 in the circuit where the motor was originally located. Thus, the battery 4 is no longer the power supply but is the load in the circuit. Switch element 127 serves to disconnect line 128 which serves as a regenerative braking path through rectifier 129 during braking of the running motor.

Power for charging the battery is obtained from a conventional AC source 130. The output of source 130 is full wave rectified by the rectifier 129 and applied to the battery line 131. Rectifier 129 includes diodes 132 through 135 placed in a full wave bridge arrangement. A capacitor 136 and a resistor 137 are connected between the input terminals of the bridge, and resistors 138 and 139 are located in the arms of the bridge occupied by diodes 134 and 135, respectively. Resistors 138 and 139 are operative to equalize current during braking.

The charging current for battery 4 is controlled in the same manner as the armature current of the motor during running condition, except that a lower maximum current value is set by placing resistor 107 in the circuit by means of the switch element 127. A maximum charging voltage is also desired and this maximum value is set by a resistor 140 and a diode 141, which serve to break down the breakdown diode 120 upon the occurrence of excessive charging voltage, in the same manner that breakdown diode 120 is broken down upon the occurrence of an excessive armature current or charging current. Fluctuations in the charging current are reduced by the use of a capacitor 142 connected across battery 4.

Since it is desired to drive the vehicle in a reverse direction as well as in a forward direction, it is necessary to provide some means for reversing the direction of rotation of the motor. To this end a switch 143 is provided. By placing the switch 143 in either position 144 or 145, relay coil 146 or relay coil 147 is energized. The relay coil 146 is energized through a diode 148 and a resistor 149, while relay coil 147 is energized through a diode 150 and a resistor 151. A diode 152 blocks the signal obtained through the diode 148 or the diode 150 during running of the motor, but provides a path for breakdown of the diode 104 during the charging operation. The relay coil 146 controls relay contacting elements 153 and 154, while relay coil 147 controls relay contacting elements 155 and 156. A diode 157 is connected between the motor armature and contacting elements 153 and 154 to aid in the production of an interlock system which prevents motor reversal except at stand-still or low speeds.

The operation of the control system will now be described.

*During running*

When switches 125, 126, and 127 are in the positions shown in the drawing the control system is in the motor run position. With the switches in this position the positive side of the battery 4 is connected to the anodes 7 of SCR's 6 through switch 125. The gating of SCR's 6 is controlled by the control circuit 26. A supply is obtained for this circuit from the line 101 which is held at a constant voltage value by the breakdown diode 104. The frequency of oscillation of the unijunction transistor oscillator in control means 26 depends upon the rate of charging of capacitor 35. Determination of the charging rate of capacitor 35 is achieved by transistor 36, which is controlled by the variable voltage device 41. For instance, if torque setting means 44 is activated to position the variable voltage device 41 to increase the bias on base 39 of transistor 36, the conduction of current through transistor 36 will be increased and the charging rate of capacitor 35 will be increased. When capacitor 35 reaches a sufficient high value of charge the voltage on the emitter 28 of UJT 27 will be sufficient to promote breakdown of the UJT and permit current flow through resistor 32. This in turn produces a signal upon the base 45 of transistor 46 to produce conduction through this transistor and apply a gating voltage to SCR's 6 through transformer 51.

When SCR's 6 are fired the positive output of battery 4 is applied to the point between winding portion 20 and diode 23. This potential produces a current through winding portion 20 and the motor armature circuit 2, and a second current through diode 23 and winding portion 21 to charge capacitor 24. The current through winding portion 21 quickly causes a negative saturation of core 22 and capacitor 24 is charged to the supply voltage. At this time the current through winding portion 20 begins to increase and the core is driven towards positive saturation. During this period a transformer action results between winding portions 20 and 21 and the capacitor is charged to a voltage greater than that produced by the power supply. When the voltage drop across resistor 25 exceeds a predetermined value because of the transformer action, a voltage of sufficient magnitude is applied to gate 15 of SCR 12 to fire SCR 12 and discharge capacitor 24, to thereby commutate or "turn-off" SCR's 6 by applying a reverse bias thereto. Since the pulses formed in this manner and applied to armature 2 have a uniform duration, the average power supplied to the motor armature depends upon the repetition rate of the pulses. Therefore, torque control circuit 26 and chopper circuit 5 control the average power applied to the armature circuit of the motor as a direct result of the control exerted by torque setting means 44.

As explained previously, the inductor 53 sustains current during the off time of the pulses so that the energy applied to the armature of the motor is averaged.

Acceleration control

The armature current through the motor is detected by the current-measuring circuit 90 and used to control the current in the shunt field winding 3. Detection of the armature current magnitude and production of a control signal is achieved by the use of the differential amplifier comprising transistors 91 and 92 and the resistor 108. As the armature current increases, the voltage drop across resistor 108 increases and since the voltage on line 101 is fixed at a constant value by breakdown diode 104, the voltage at the point between resistors 109 and 110 also increases. This increase in voltage at the point between resistors 109 and 110 increases the forward bias on transistor 91 and causes it to conduct more heavily. This increased current also increases the total current through resistors 106 and 107 and thus increases the potential on emitters 93 and 96, which tends to decrease the current through transistors 91 and 92. The decrease in current then decreases the voltage on emitters 93 and 96 which in turn promotes another increase in current. However, after a short period of time a balanced condition is reached in which a greater amount of current flows through transistor 91 than through transistor 92. Since the current flow through transistor 91 is greater than the current flow through transistor 92 the voltage drop across resistor 102 is greater than the voltage drop across resistor 103, so that the potential on collector 94 is at a lower value than the potential on collector 97.

The potential at collector 94 of transistor 91 is applied to base 117 of transistor 114 which acts as a voltage responsive device in response to the change in output of the differential amplifier. This decrease in potential on the base of the transistor 114 reduces its forward bias and causes a reduction in the current flow through the transistor, or an increase in the resistance of transistor 114. This reduced current flow, or increased resistance, is used to control a unijunction transistor oscillator in control means 56. This UJT oscillator is essentially the same as the UJT oscillator described in the speed control circuit 26.

In the UJT oscillator located in control means 56, the capacitor 81 corresponds to capacitor 35 in torque control means 26, and transistor 82 corresponds to transistor 36. However, transistor 114 is connected in parallel with transistor 82 and capacitor 81. As the current flow through transistor 114 decreases and the resistance of transistor 114 increases, the current flow through transistor 82 increases. This is so because the voltage on line 88 remains the same as the resistance of transistor 114 increases, but the decreased current flow through transistor 114 means that the current flow through transistor 82 must increase to maintain the same voltage drop across resistor 89. The increased current flow through transistor 82 causes capacitor 81 to charge at a greater rate so that unijunction transistor 70 is fired more frequently and the rate of oscillation is increased. The output of the UJT oscillator is applied to a chopper circuit, similar to the chopper circuit 5 described above, to increase the chopping rate, or repetition, rate of current pulses. This increase in the repetition rate of current pulses increases the average current through shunt field 3 and thereby increases the flux in the motor.

It should be noted that as the armature current decreases the current in shunt field 3 will also be decreased so that at a constant running speed the field current will be only that necessary.

Since the operation of the chopper circuit in the control means 56 is somewhat different from that shown in the chopper circuit 5, the operation of this circuit will now be briefly described. Upon firing of SCR 57 by the output of the unijunction transistor oscillator applied to gate 62 of the SCR 57, conduction occurs through winding portions 63 and 64 of the saturable core transformer 58. The current flow through portion 63 is from the positive side of the power supply through switch 154 or 156, depending upon whether the motor is in the forward or reverse operating condition, shunt field 3, winding portion 63 and SCR 57 to the negative side of the power supply. Similarly, the current through winding portion 64 is from capacitor 59 to the negative side of the power supply. Since the ampere turns of portion 64 is large during this charging period the core is driven to negative saturation to charge the capacitor to the full value of the power supply upon saturation of the core of transformer 58. After this negative saturation of the core, the current through the load and winding portion 63 increases and starts driving the core in the positive saturation direction, meanwhile increasing the voltage across capacitor 59 to above the potential of the power supply by transformer action. This increased current in portion 63 causes core saturation in the forward direction. Upon saturation of the core in the forward direction capacitor 59 discharges and turns off or resets SCR 57. Due to the high potential formed across capacitor 59, the discharge through winding portions 63 and 64, and the field winding 3 is quite large and would normally produce a high positive voltage on the side of capacitor 59 which is connected to winding portion 64. However, diode 65 and resistor 66 have been added to prevent this occurrence so that upon reset of the circuit, when the voltage at this point exceeds the voltage of the power supply, conduction will occur through diode 65 to prevent overshoot of the capacitor voltage and the resulting excessive reset of the saturable core transformer 58.

Braking

The operation just described for producing desirable acceleration characteristics is the same that occurs during continuously variable regenerative braking, since an increase in the current in field 3 increases the flux in the motor, thereby increasing the counter EMF above the battery voltage and producing regenerative charging of battery 4. The only difference in operation is that transistor 92 of the differential amplifier is that which produces the initial action to provide an output signal. For instance, if braking is desired the variable voltage device 111 is set to a lower potential value by the braking means 119. This reduces the bias on base 98 of transistor 92 to reduce the current flow through transistor 92 and thereby reduce the voltage drop across resistor 103, while increasing the voltage drop across resistor 102 to produce the same increase in signal that is realized upon the production of a large armature current. This action produces a continuously variable braking, rather than the step-by-step braking achieved with prior art braking devices.

Charging

During the charging operation switches 125, 126, and 127 are thrown to the opposite postions from that shown in the drawing. By this switch arrangement the battery replaces the motor in the circuit as the load. Power is now applied to the circuit through line 131 from the rectifier 129. The operation of chopper circuit 5 and speed control circuit 26 is the same as that described above for running of the motor. Switch 127 removes the regenerative braking path and adds resistor 107 to resistor 108 in the current return path. This additional resistor means that the torque control circuit 26 will have a lower maximum frequency.

The current limiting feature in both this phase and the motor running phase is a result of the differential amplifier, comprising transistors 91 and 92, the operation of which has been previously described. When a large current produces the differential amplifier action described above such that, for example, the voltage drop across resistor 102 is greater than the voltage drop across resistor 103, the difference in the voltages produces an output voltage at the point between diodes 99 and 100. This voltage will be that produced in the circuit with the lower current flow, as in this example it would be the voltage on collector 97, since diode 99 will be back biased. This voltage is then applied to the breakdown diode 120 and if the armature or charging current is great enough the voltage drop across resistor 103 will be so small that the diode 120 will be broken down. Breakdown of diode 120 biases transistor 122 to a point that limits the current flow through transistor 36 and therefore limits the charging rate of capacitor 35.

During the charging operation a voltage limiting effect is also obtained by placing resistor 140 across the battery. The voltage obtained from resistor 140 is applied to breakdown diode 120 through diode 141 and if the voltage across the battery exceeds a specified value diode 120 will be broken down and a maximum unijunction transistor oscillator frequency will be set, as in the current limiting phase described above.

Motor reversal

Motor reversal is achieved by switch 143. If switch 143 is placed in position 144 the relay coil 146 will be energized through resistor 149. Energization of relay coil 146 results in the closing of relay contacting elements 153 and 154. By moving switch 143 to position 145, relay coil 147 will be energized and close relay contacting elements 155 and 156, if the motor is at stand-still or a low speed.

Since it is desirable to prevent motor reversal if the motor speed is much above stand-still, the diode 157 is connected from the motor armature to the contact 153. If the motor speed is then at a value sufficient to produce a sizable back EMF, the relay coil 146 will still be energized even though switch 143 is thrown to posiiton 145. A mechanical interlock or bias arrangement (not shown) is provided between the contacting elements 153 and 155 so that as long as the contacting element 153 is held in its closed position the contacting element 155 cannot be closed. The same is true for the contacting element 156. Thus, motor reversal is prevented unless the motor is at stand-still or a very low speed.

Although the invention has been described with respect to certain specific embodiments, it will be appreciated that modifications and changes may be made by those skilled in the art without departing from the basic teachings of the invention. Therefore, it is desired not to limit the following claims to the specific embodiments shown, but to cover all modifications and changes within the spirit and scope of the invention.

What I claim as new and desire to secure by Letters Patent of the United States is:

1. In a battery-powered D-C motor circuit, a control system comprising: means for converting a unidirectional signal into a series of unidirectional pulses; means for selectively applying the unidirectional pulses to motor or to a battery; torque control means for setting the repetition rate of the unidirectional pulses; current measuring means including differential amplifier means for selectively connecting said current measuring means to the motor or to the battery to detect the magnitude of the motor armature current or the battery charging current; a breakdown voltage device connected between said differential amplifier and said torque control means to limit the repetition rate of the unidirectional pulses when the magnitude of the current exceeds a predetermined value; and means for selectively obtaining the unidirectional signal from the battery to power the motor or from an external source to charge the battery.

2. A control system as recited in claim 1 wherein said means for converting a unidirectional signal into a series of unidirectional pulses comprises a controlled rectifier chopper circuit; said torque control means comprises a relaxation oscillator; and said means for selectively obtaining said unidirectional signal comprises a switching circuit.

3. A control system as recited in claim 1 and further comprising: means to limit the magnitude of the voltage across the battery during charging of the battery, said last-named means being connected to said breakdown device to limit the frequency of repetition of said unidirectional pulses when a predetermined voltage magnitude is exceeded.

References Cited
UNITED STATES PATENTS

| | | | |
|---|---|---|---|
| 3,207,966 | 9/1965 | Parkinson | 320—5 X |
| 3,305,760 | 2/1967 | Davis et al. | 321—45 |
| 3,316,417 | 4/1967 | Tolmie | 318—139 |

JOHN F. COUCH, *Primary Examiner.*

STANLEY WEINBERG, *Assistant Examiner.*